US 7,063,213 B2
Jun. 20, 2006

(12) United States Patent
Allen, III et al.

(10) Patent No.: US 7,063,213 B2
(45) Date of Patent: Jun. 20, 2006

(54) MEDIATING ELECTROSTATIC SEPARATION

(75) Inventors: Laurence E. Allen, III, San Rafael, CA (US); Brian L. Riise, San Ramon, CA (US)

(73) Assignee: MBA Polymers, Inc., Richmond, CA (US)

( * ) Notice: Subject to any disclaimer, the term of this patent is extended or adjusted under 35 U.S.C. 154(b) by 0 days.

(21) Appl. No.: 10/775,741

(22) Filed: Feb. 9, 2004

(65) Prior Publication Data

US 2004/0182753 A1 Sep. 23, 2004

Related U.S. Application Data

(63) Continuation of application No. PCT/US03/22931, filed on Jul. 22, 2003.

(60) Provisional application No. 60/397,980, filed on Jul. 22, 2002.

(51) Int. Cl.
*B03B 1/00* (2006.01)

(52) U.S. Cl. .................... 209/3; 209/8; 209/127.1; 209/127.3

(58) Field of Classification Search ............. 209/12.2, 209/127.1, 127.3, 128–130, 3–5, 7–9
See application file for complete search history.

(56) References Cited

U.S. PATENT DOCUMENTS

| | | | |
|---|---|---|---|
| 3,888,678 A | 6/1975 | Bailey, Jr. et al. | |
| 4,326,951 A | 4/1982 | Broz | |
| 4,363,723 A | 12/1982 | Knoll et al. | |
| 4,514,289 A | 4/1985 | Inculet | |
| 4,517,078 A | 5/1985 | Inculet et al. | |
| 4,557,827 A | 12/1985 | Fricke et al. | |
| 4,570,861 A | 2/1986 | Zentgraf et al. | |
| 4,578,184 A * | 3/1986 | Rasmussen | 209/3 |
| 4,797,201 A | 1/1989 | Küppers et al. | |
| 5,118,407 A | 6/1992 | Beck et al. | |
| 5,227,700 A | 7/1993 | Nagai et al. | |
| 5,234,110 A * | 8/1993 | Kobler | 209/166 |
| 5,246,115 A * | 9/1993 | Vezzoli et al. | 209/2 |
| 5,251,762 A | 10/1993 | Taylor et al. | |
| 5,289,922 A | 3/1994 | Inculet et al. | |
| 5,358,119 A | 10/1994 | Stahl et al. | |
| 5,366,091 A | 11/1994 | Stahl et al. | |
| 5,476,709 A | 12/1995 | Inoue et al. | |

(Continued)

FOREIGN PATENT DOCUMENTS

EP 0 396 745 B1 11/1990

(Continued)

OTHER PUBLICATIONS

Brandrup et al., "Recycling and Recovery of Plastics", 1996, Hanser/Gardner Publications, Inc., Cincinnati, pp. 265-286.

(Continued)

*Primary Examiner*—Joseph Rodriguez
(74) *Attorney, Agent, or Firm*—Fish & Richardson P.C.

(57) ABSTRACT

Methods, systems and media for separating polymer mixtures. A mixture including polymeric components is provided. A particulate media is added to the mixture, where the particulate media can selectively mediate a triboelectric charging of the polymer mixture. The media includes a polymeric material having a selected position within an electrostatic charging sequence and a functional additive. The mixture is triboelectrically charged with the media. Two or more components of the polymer mixture are separated according to the triboelectric charge. A portion of the particulate media can be recovered using a recovery process, where the functional additive is selected for compatibility with the recovery process.

18 Claims, 2 Drawing Sheets

U.S. PATENT DOCUMENTS

| | | | |
|---|---|---|---|
| 5,502,118 A | 3/1996 | Macholdt et al. | |
| 5,566,832 A * | 10/1996 | Stuckrad et al. | 209/9 |
| 5,746,320 A | 5/1998 | Fujita et al. | |
| 5,844,089 A | 12/1998 | Hoffman et al. | |
| 5,888,274 A | 3/1999 | Frederick | |
| 5,944,875 A | 8/1999 | Stencil et al. | |
| 6,011,229 A | 1/2000 | Geisler | |
| 6,034,342 A | 3/2000 | Schmoutziguer et al. | |
| 6,070,733 A * | 6/2000 | Osing | 209/8 |
| 6,114,499 A | 9/2000 | Kazmaier et al. | |
| 6,187,494 B1 | 2/2001 | Kawamura et al. | |
| 6,271,492 B1 | 8/2001 | Machata et al. | |
| 6,452,126 B1 | 9/2002 | Xiao et al. | |
| 6,720,514 B1 * | 4/2004 | Inoue et al. | 209/128 |
| 2004/0035756 A1 * | 2/2004 | Mankosa et al. | 209/8 |

FOREIGN PATENT DOCUMENTS

| | | |
|---|---|---|
| EP | 0 434 018 B1 | 6/1991 |
| EP | 0 834 941 A1 | 4/1998 |
| EP | 1 132 140 A1 | 9/2001 |
| JP | 02-048038 | 2/1990 |
| JP | 05-007796 | 1/1993 |
| JP | 09-299828 | 11/1997 |
| JP | 10-204444 | 8/1998 |
| JP | 10-245569 | 9/1998 |
| JP | 10-263436 | 10/1998 |
| JP | 10-263437 | 10/1998 |
| JP | 11-123346 | 5/1999 |
| JP | 11-140755 | 5/1999 |
| JP | 11-160296 | 6/1999 |
| JP | 11-347441 | 12/1999 |
| JP | 2000-001452 | 1/2000 |
| JP | 2000-042493 | 2/2000 |
| JP | 2000-044723 | 2/2000 |
| JP | 2000-061356 | 2/2000 |
| JP | 2000-061357 | 2/2000 |
| JP | 2000-061358 | 2/2000 |
| JP | 2000-126649 | 5/2000 |
| JP | 2000-153180 | 6/2000 |
| JP | 2000-246141 | 9/2000 |
| JP | 2000-246142 | 9/2000 |
| JP | 2000-308837 | 11/2000 |
| JP | 2000-325832 | 11/2000 |
| WO | WO93/06934 | 4/1993 |
| WO | WO98/28080 | 7/1998 |
| WO | WO00/29119 | 5/2000 |
| WO | WO/0027534 A1 | 5/2000 |
| WO | WO/0074855 A1 | 12/2000 |
| WO | WO/0121318 A1 | 3/2001 |

OTHER PUBLICATIONS

Chang et al., "Handbook of Electrostatic Processes", 1995, Marcel Dekker, Inc., pp. 1-23, 25-38-49, 195-224, 365-386 and 733-748.

Higashiyama et al., "The Effect of an Externally Added Charge Control Agent on Contact Charging Between Polymers", Journal of Electrostatics, 1993, 30, pp. 203-212.

Ku et al., "Electrical Properties of Polymers, Chemical Principles", 1987, Hanser Publishers, pp. 1-56.

Ralston, "Electrostatic Separation of Mixed Granular Solids", 1961, Elsevier Publishing Company, pp. 30-35, 80-85, 104-107.

Taylor et al., "Industrial Electrostatics: Fundamentals and Measurements", 1994, Research Studies Press LTD, pp. 1-125.

Weiss, "SME Mineral Processing Handbook", 1985, American Institute of Mining, Metallurgical, and Petroleum Engineers, Inc., Vo. 1, Section 6, 6-1-6-48.

Harper, W.R., "Contact and Frictional Electrification", 1998, The Laplacian Press Series on Electrostatics, pp. 1-74.

* cited by examiner

MEDIATING ELECTROSTATIC SEPARATION

CROSS-REFERENCE TO RELATED APPLICATIONS

This application is a continuation of International Application No. PCT/US03/22931, filed Jul. 22, 2003, which claims priority to U.S. Provisional Application No. 60/397,980, filed Jul. 22, 2002, which are incorporated by reference herein.

TECHNICAL FIELD

This invention relates to separating materials and recycling plastics.

BACKGROUND

By generating over 10 of millions metric tons of material, hundreds of billions of dollars of production per year, and being responsible for approximately millions of jobs, plastics and related businesses represent the fourth largest industry in the United States. Unlike other material industries such as steel and aluminum, however, this industry depends almost solely on nonrenewable raw material, mostly imported petroleum. This dependence becomes even more significant as the growth rate of plastics continues to outpace that of all other materials.

Most of the plastic supplied by today's manufacturers ends its life in landfills or incinerators simply because the technology has not been available to recover it economically. The Environmental Protection Agency estimates that the amount of plastic in municipal solid waste grew from less than 1 million metric tons prior to 1960 to over 20 million metric tons by 2000. Take-back and producer-responsibility legislation is becoming increasingly common to help deal with the quantities of plastics being produced.

Durable goods, such as automobiles, appliances and electronics equipment, account for about one-third of the plastics in municipal solid waste. Durable goods are increasingly being collected and partially recycled at the end of their useful lives to avoid disposal costs and potential liabilities, and to recover metals and other marketable raw materials.

The recovery of plastics from durable goods requires a plastic-rich raw material. Automobiles, appliances and electronics generally contain metals. Generally, the metals content is higher than the plastics content (typically plastics content is less than 30%) in these items, so a metal recovery operation must precede plastic recovery. Most metal recovery operations shred equipment in order to cost-effectively liberate metals from whole parts. Large-scale plastic recovery operations must be able to source this plastic-rich raw material from a number of metal recovery operations.

Most plastic parts coming from durable goods streams present unique challenges that are not met by the plastics bottle cleaning and sorting processes developed for curbside feedstocks. The principle practice today for the recovery of highly contaminated scrap is hand-separation done overseas at significant local environmental cost. The challenges in recycling plastics from durable goods include: multiple plastic types, multiple resin grades of plastic (there can be over 50 different grades of one plastic resin type, such as acrylonitrile butadiene styrene (ABS)); fillers, reinforcements, and pigments; metal; paint and metallic coatings; and highly variable part sizes and shapes.

A grade of plastic is a formulation of plastic material with a particular set of targeted physical characteristics or properties. The particular physical characteristics or properties of a grade are controlled by the chemical composition of the polymers in the grade, the average molecular weights and molecular weight distributions of polymers in the grade, the rubber morphology for impact modified grades, and the group of additives in the grade.

Different grades of a given plastic type are generally compatible. Grades can generally be melt mixed to create a new material with a different property profile. Different plastic types, on the other hand, cannot generally be melt combined as easily unless the types happen to be compatible. Blending different plastic types such as high-impact polystyrene (HIPS) and ABS is often avoided except in special situations.

Typical suppliers of plastics-rich feed stocks are metal recyclers or shredders who can process a number of types of durable goods in a single facility. Feedstocks derived from durable goods can therefore be highly variable mixtures of different types of durable goods. Generally, the plastics are broken down into particles which are typically less than about 100 mm in size, such as flakes or pellets. The particles can be formed from a single material or a combination of materials, such as various plastics, rubber, metal or other materials.

In order to create high value products, the plastic recycling process must be able to separate highly mixed streams on a flake-by-flake basis to achieve high throughput rates of products with acceptable purity. Methods such as separation by density, Density Differential Alteration, froth flotation, color sorting and triboelectrostatic separation (TES), have been used alone or in combination to achieve some purification of the plastics derived from durable goods, as described, for example, in, U.S. Pat. No. 6,238,579, U.S. Pat. No. 6,335,376, U.S. Pat. No. 5,653,867, U.S. Pat. No. 5,399,433, and U.S. Provisional Application No. 60/397,980, filed on Jul. 22, 2002, each of which is incorporated by reference herein. The acceptable purity depends on the primary plastic and contaminants.

TES is a low cost technique known for separating a simple plastic mixture because it has a negligible energy requirement and the device is rather simple. Because of its great potential for application in the separation and purification of plastics from durable goods, TES is one of the techniques that can be employed in plastics recycling plants.

TES is a relatively simple technique. Particles typically gain or lose electrons when they come into contact with other particles or with parts of the process equipment in a TES separator. Such charging by contact or friction is known as triboelectric charging, as described, for example, in W. R. Harper, *Contact and Frictional Electrification*, Oxford University Press, 1967.

Figure 1:
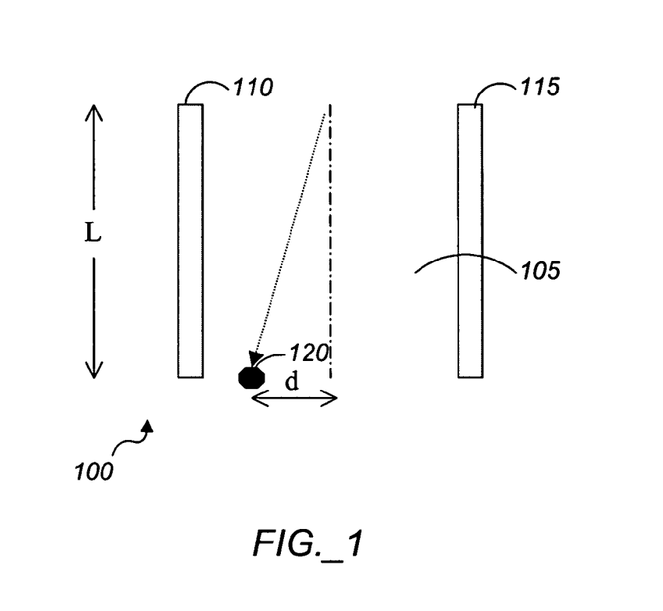
FIG. 1 is a schematic diagram showing how charged particles deflect in an electric field.

In TES separation, the feed material is charged in a charging device. The charged material is then passed through a high-voltage electric field in the TES separator such that the material is deflected depending on its charge to mass ratio. As shown in TES separator 100 of FIG. 1, an electrostatic separation region 105 in TES separator 100 includes negative and positive electrodes 110, 115. As the plastic feed falls by gravity through separation region 105, positively charged plastic 120 deflects toward negative electrode 110 and the negatively charged plastic deflects toward the positive electrode. At the end of separation region 105, a baffle is arranged to deflect the original feed material stream into different collection containers. For example, a material with a zero initial velocity falling vertically through a horizontal electric field deflects horizontally by an amount proportional to the charge to mass ratio of the particle, as shown in Equation 1.

$$\frac{d}{L} = \frac{qE}{mg} \propto \frac{q}{m} \qquad (1)$$

In practice, this deflection ranges from several centimeters to half a meter. The portion in the middle of the separation region, the middlings, generally has a charge that is between the materials that are deflected in either direction, or close to neutral.

One of the difficulties encountered in TES is the fact that there is a distribution of charge to mass ratios in any species of a mixture. This means that there will also be a distribution of particle deflections after falling through an electric field. The broader this distribution, the less likely it will be to separate different types of materials. In order to achieve a consistent separation with high purity products, it can be important to control the charge to mass ratios of particles fed to the TES separator, as described, for example, in International Application No. PCT/US03/11642, filed on Apr. 14, 2003, which is incorporated herein by reference. The distribution of charge to mass ratios that determines the distribution of particle deflections includes a contribution from a charge per surface area distribution and a contribution from a surface area to mass distribution. Controlling the charge to surface area and surface area to mass distributions leads to a more consistent and adequate separations. Techniques for controlling the surface area to mass ratio of mixtures fed to a TES separator developed by MBA Polymers are described in commonly-assigned U.S. Provisional Application No. 60/397,948, filed on Jul. 22, 2002, which is incorporated by reference herein.

Commonly-assigned U.S. Pat. No. 6,452,126 describes a technique known as "mediated triboelectrostatic separation" that enables more consistent and effective charging of plastics in mixtures as complex and variable as post-consumer plastics. Mediation controls the charge per surface area of the particles to be separated by adding an extra component known as "media" to the mixture. Media can include a single component or multiple components. The media is added to the mixture in such excess that the charge on the components to be separated is controlled solely by their ability to charge relative to the media.

SUMMARY

Plastics of different types and grades have a wide variety of physical properties. Typically, each type and grade of plastic is selected for use based on those physical properties that meet the requirements of the use. Thus, it is valuable to recover a fairly pure stream of plastic particles from a mixture of plastics, such as a mixture obtained from recycled plastic feed, so that the plastics can be used again. A triboelectric separator is one system that can be used to recover such a pure stream. To improve the performance of the triboelectric separator, media is added to the mixture to charge the particles and ensure consistent charging within each grade and type of plastic. However, adding a new material (media) to the plastic mixture can be antithetical to the goal of separation. The invention provides techniques for enhancing separation of plastics and improving the plastic products derived from the separation using media, by removing the media from the recovered plastic or allowing a beneficial portion of the media to remain with the recovered plastic streams.

In general, in one aspect, the invention features methods for separating a polymer mixture. A mixture including polymeric components is provided. A particulate media is added to the mixture, where the particulate media can selectively mediate a triboelectric charging of the polymer mixture. The media includes a polymeric material having a selected position within an electrostatic charging sequence and a functional additive. The mixture is triboelectrically charged with the media. Two or more components of the polymer mixture are separated according to the triboelectric charge. A portion of the particulate media is recovered using a recovery process. The functional additive is selected for compatibility with the recovery process. In general, in another aspect, the invention provides methods for preparing a media for use in separating a polymer mixture by triboelectric separation. The methods include selecting one or more polymeric materials to be used in a charging media in a triboelectric separation of a polymer mixture, selecting one or more functional additives according to a media recovery process to be used in the triboelectric separation, and combining the selected polymeric materials and the selected functional additives to generate a particulate media for use in the triboelectric separation.

In general, in another aspect, the invention provides a system for separating a polymer mixture. The system includes a particulate charging media for selectively mediating a triboelectric charging of a polymer mixture, a charging chamber for triboelectrically charging the polymer mixture and the charging media, a separation chamber for separating two or more charged polymeric components of the polymer mixture according to the triboelectric charge, and a media recovery device for recovering at least a portion of the charging media according to a media recovery process. The charging media includes one or more polymeric materials suitable for selectively mediating the charging of the polymer mixture. The charging media includes a polymeric material having a selected position within an electrostatic charging sequence. The charging media includes one or more functional additives compatible with the media recovery process.

Particular implementations of these can include one or more of the following features. The recovery can be performed either before or after the separation. The recovery process can be a magnetic recovery process, a color sorting process, or a density separation process and the functional additive can be a ferromagnetic material, a colored material or a density augmenting material for each of the respective processes. The recovery process can be based on a thickness or surface-to-mass ratio and the functional additive can be a foaming agent. The recovery process can include collecting a neutral middle fraction in a triboelectric separator and the functional additive can be a conductive material. In systems implementing such processes, the media recovery device can include a triboelectric separator. The functional additive can be a conductive material, and the separating and recovering can include passing the charged mixture and media through an electric field to cause the components to and media to deflect in different amounts and thus separate.

In general, in another aspect, the invention features methods and systems for separating a polymer mixture. A media is added to a mixture of polymeric components. The media is selected to be a compatibilizer for reducing the interfacial energy in a target blend of one of the polymeric components and an incompatible polymer by preferentially concentrating at an interface between the component and incompatible polymer. The polymer mixture is separated so that a polymeric product is generated that includes the target blend and compatibilizer. In particular implementations, the incompatible polymer can be a component of the polymer mixture. The compatibilizer can have an affinity for the polymeric component and the incompatible polymer. The compatibilizer can include a copolymer of the component and the incompatible polymer.

In general, in yet another aspect, the invention provides systems for separating polymeric materials. The systems include a roll sorter and a separation chamber for separating the two or more charged polymeric components of the polymer mixture based on a triboelectric charge. The roll sorter includes rotatable cylinders coated with material incorporating a charging media for selectively mediating a triboelectric charging of two or more components of a polymer mixture. The coating can be a thin film or paint incorporating the charging media.

In general, in another aspect, the invention provides further methods of separating a polymer mixture. The methods include providing a mixture including polymeric components, adding to the mixture a particulate media for selectively mediating a triboelectric charging of the polymer mixture, electrically charging the media with a high voltage source, triboelectrically charging the mixture with the charged media, and separating two or more components of the polymer mixture according to the triboelectric charge. The charging media includes a polymeric material having a selected position within an electrostatic charging sequence, and conductive additive. The method can further include discharging the charged media after the triboelectric charging, and recovering the discharged media as a neutral fraction in a triboelectric separator.

In general, in another aspect, the invention provides further methods of separating a polymer mixture. The methods include providing a mixture including polymeric components, adding to the mixture a particulate media for selectively mediating a triboelectric charging of the polymer mixture, triboelectrically charging the mixture with the media, and separating two or more components of the polymer mixture according to the triboelectric charge. The charging media can include a polymeric material having a selected position within an electrostatic charging sequence, and a ferromagnetic additive.

Particular embodiments can include one or more of the following features. The media can be recycled after separation. Recycling the media after separation can include recirculating a middle stream from a ternary separation of the mixture. Separating the media can include separating only a portion of the media from the components of the mixture. The media can be incorporated into a charging device. The charging device can be constructed at least in part from the media. At least a portion of the charging device can be coated with a layer of the media. The layer of the media can be applied as paint or as a thin film.

The media can include one or more additives that improve the recoverability of the media. The additives can include conductive materials, ferromagnetic materials, colorants, density augmentation additives, or foaming agents. Media incorporating ferromagnetic materials can be separated from the mixture using magnets. The ferromagnetic materials can include a ferromagnetic powder such as iron powder or magnetite. Media incorporating colorants can be separated from the mixture using a color sorter. Media incorporating density augmentation materials can be separated using density separation techniques. Media incorporating foaming agents can be separated by heating the mixture to activate the foaming agent and separating media particles from the mixture based on thickness or surface to mass ratio. The additives can include materials that increase the conductivity of the media.

The media can include one or more materials that need not be completely recovered from the mixture (or recovered at all). The media can incorporate a material that functions as a compatibilizer of one or more materials in the mixture. The media can be formed from the compatibilizing material, or the compatibilizer can be incorporated as an additive. The compatibilizer can have a set of triboelectrical properties between those of two components of the mixture. The compatibilizer can have a dielectric constant between the dielectric constants of two components of the mixture.

The media can include a blend of two or more materials. One or more of the materials in the blend can be a component or components of the mixture to be separated. The materials in the blend can be selected to provide a blended media that charges intermediately between two or more components of the mixture to be separated. The blended media can be prepared by extruding the two or more materials together in a predetermined ratio.

In order to effectively control how the media charges the feed mixtures, the charge on the media must be controlled. Methods such as de-ionization, dust removal and control, washing the media in a liquid such as water or water with additives to enhance cleanliness, constant addition of a controlled fraction of regenerated media from a reservoir and the use of conductive media are described below.

The invention can be implemented to provide one or more of the following advantages. Recovering media before or after the separation reduces the expense associated with preparing or acquiring media, and can lead to the isolation of more pure products from triboelectric separation. Incorporating additives into charging media can improve the recoverability of the media. Incorporating conductive or ferromagnetic material into the media can reduce charge build-up on the media and can provide more control over the charge the media applies to the mixture. Further, a mixture of plastic feed and ferromagnetic media can be agitated with strong magnet bars or stirrers. Using recovery techniques based on factors other than particle size can improve the throughput of the separation process. Incorporating compatibilizers into the media, or selecting as media materials that can also function as a compatibilizer for two or more components of the mixture can avoid the need to recover or separate media from the resulting products and can result in products having improved properties.

Enhanced media recovery generally reduces the quantity of media that is needed, thereby reducing the manufacture of media. If techniques exist for easily recovering media from mixtures, the precise form of the media, such as size and geometry, may be less crucial allowing for inexpensive and simple methods of manufacture, such as pelletization.

The details of one or more embodiments of the invention are set forth in the accompanying drawings and the description below. Unless otherwise defined, all technical and scientific terms used herein have the meaning commonly understood by one of ordinary skill in the art to which this invention belongs. All publications, patent applications, patents, and other references mentioned herein are incorporated by reference in their entirety. In case of conflict, the present specification, including definitions, will control. Other features and advantages of the invention will become apparent from the description, the drawings, and the claims.

DESCRIPTION OF DRAWINGS

Like reference numbers and designations in the various drawings indicate like elements.

DETAILED DESCRIPTION

A mixture made up of two or more plastic material components can be separated using a TES separator. However, the TES separator is only as effective as the consistency of the charge to mass distribution and charge to surface area of each component of the plastic mixture. Adding media to the plastic mixture controls the triboelectric charging of the components of the plastic mixture, particularly when the media is selected to have a charging characteristic which is somewhere between the charging characteristics of the components of the plastic mixture. Thus, when selecting a media to triboelectrically charge the plastic mixture, one factor in the selection process can be the charging characteristic of the media.

Another factor in the selection process can be whether the media is to be incorporated into one or more of the plastic products or, conversely separated out from the products of the plastic mixture. If the media is to be separated out, the media can be selected or manufactured to have characteristics that facilitate removal. Alternatively, in some instances, the media is not separated out and at least some portion of the media remains in one or more products. Where the media will not be separated out, the media can be selected to be a compatibilizer for the product when mixed with another plastic grade or type.

In some cases it can be desirable to recover the media used to control the charging of plastic flake mixtures in triboelectric separation. Since the charging media is typically specially formulated for its charging properties and since it can be produced in a custom geometry, the media can be fairly expensive. In addition, relatively large quantities of media are required to give sufficient surface area for charging. Without high recovery rates of the media, using a mediated charging process can be expensive, and can introduce unwanted components into the final product.

One technique to allow media recovery is to make the media a different size or thickness than the flake mixture to be charged. Bigger or thicker media particles can be separated from smaller flakes either before or after falling through a TES separator, and can thus be recovered efficiently. Screening or vibratory settling can be used to separate the media from the mixture if the two are substantially different in size. Large amounts of media are typically required when media particles are larger or thicker than flakes in the mixture. In addition, fabrication of much larger media particles can be relatively expensive. If the media is recovered by screening, it must be either smaller or larger than the mixture. The mixture to be separated is typically ground quite finely, so that a maximum charge to mass ratio can be achieved. When the flakes in the mixture are already small, it can be difficult to recover a smaller media efficiently. In addition, very small particles with a high surface to mass ratio tend to stick on surfaces and can be difficult to recover. Using larger media can avoid these problems. Manufacturing larger media can include: injection molding high surface area to mass discs, or extruding and chopping pellets, thin discs or sheet.

If the media particles have a very low surface to mass ratio (bulky particles), they are not likely to acquire sufficient charge to achieve a large enough charge to mass ratio to deflect very far horizontally in the TES. The vast majority of low surface to mass media particles can therefore typically be recovered in the center output fraction of the TES. This center fraction is typically recirculated back to the charging device for the TES, so very few media particles are lost. Performance of the separator may be enhanced by incorporation of additives in the media that further reduce charge to mass ratio by adding mass or allowing charge to be carried away to ground by conductance.

Alternatively, or in addition, a media material can be permanently incorporated in the charging device. For example, if the media material is incorporated into a vibratory feeder that will be used in the separation, there is no need for special separation of the media from the feed mixture. Similarly, a charging device can be coated with a thin film of media—for example, by painting or attaching a thin film sheet that incorporates the media onto a surface of the charging device. The thin film can be formed from the same materials used in loose media, such as plastic and functional additives. Incorporating functional additives, such as conductive materials or antistatic fillers, can prevent the thin film from building up an abundance of charge. If the media is painted onto the device, the paint can be a solution cast film with the same composition as that of extruded plastic films. The paint or sheet can be chosen to have appropriate charging properties and can be removed and reapplied or redone as frequently as necessary to ensure that the media remains capable of charging the mixture appropriately.

In another charging technique, a film of media is wrapped around paired rotating cylinders with an adjustable gap. The cylinders can be inclined along the length of the separation device to allow the mixture to contact the cylinder and fall where the gap is wide enough for the particles to fall through to the TES. The plastic mixture spreads lengthwise along the space between charged plates or rolls. This enables the mixture to be segregated into thin and thick components so the appropriate charge to mass ratio particles can be fed to different areas of the separator when the separator has a different field configuration or intensity in one area than in another. Loose media can be used in addition to the thin sheet.

Yet another mediating technique includes continuously coating a conductive feeding device with a bed of high bulk density media particles that preferentially segregate to the device surface because of their greater bulk density. If the media particles have a ferromagnetic property, they can be attracted preferentially to the surface of the feeder or charging device using magnets above, within or under the surface of the device regardless of the media's density.

One or more functional additives can be incorporated into the media to facilitate recovery of the media from the components of the polymer mixture. For example, ferromagnetic material can be added to media so that magnets, or a device including magnets, can be used to separate the media from the flake mixture. Since media geometry will have little or no effect on recoverability of such media, the media can be prepared in any size and geometry that is convenient to produce.

Media incorporating a ferromagnetic additive can be prepared by incorporating a ferromagnetic material such as a ferromagnetic powder into a plastic media material. Any type of ferromagnetic material can be used that is compatible with the desired medial material and the techniques used to combine the media and ferromagnetic materials. In particular embodiments, magnetite powder, metallic fibers, carbon black and iron powder have been found to be acceptable.

The particle size of the ferromagnetic powder can generally be as small as 1 micron to as large as 3 mm. Larger powders have a smaller surface area and are less likely to interfere with the charging properties of the media. Ferromagnetic materials having particle sizes coarser than 3 mm can cause undesirable wear on parts—for example, on the extruder barrel during the extrusion of the media. However, this need not be a limitation if high wear is acceptable. If a different pellet forming technique is used, such as chopping a sheet that is hot pressed together, coarse size of the ferromagnetic material may be less troublesome and the particle size of the ferromagnetic material can be as large as 8 mm.

The media incorporating ferromagnetic additives can be prepared using conventional techniques, such as pelletization. Alternatively, the media can be prepared by coating particles (e.g., spheres or cylinders) of ferromagnetic material with a desired media. For example, 0.5 to 8 mm spheres or cylinders coated with the selected charging media can be prepared. A wire coating technique can thus be used for forming the media by pulling a ferromagnetic wire through an extrusion-coating device and then chopping the wire into small cylinders. Another forming technique is to laminate a ferromagnetic plate on both sides and then chop or dice the plate into appropriately sized pieces.

The media can incorporate as much as about 90% by weight or as little as 2% by weight of the ferromagnetic material. In particular embodiments, it is anticipated that between about 2% and about 60% by weight of ferromagnetic material will be suitable.

In one embodiment, pelletized media smaller than 8 mm has ferromagnetic material compounded into the plastic at approximately 52% by weight. The ferromagnetic additive is powdered iron with particle size less than 200 microns. This size and quantity of ferromagnetic material enables the pelletized media to be captured by a plate magnet from approximately a distance of 150 mm.

A particular advantage of compounding a powdered conductive ferromagnetic material into the media is that the conductivity of the media can be substantially increased. This reduces charge build-up on the media and gives more control over the charge the media applies to the mixture. Conductive media can be neutralized simply by contact with a grounded surface or it can be charged by contact with a charged conductive surface. If non-conductive media is used which is not neutralized, a charge of a given polarity can build up and it will be less easy to apply a wide but controlled range of charges of that polarity to mixture components. A conductive media can be charged either positively or negatively with respect to ground to alter the charging performance. If the conductive media attains a strong charge in one polarity, a broader range of charges can be created in the opposite polarity. Thus, conductive media allows very effective control of media performance because it allows all of the media to have approximately the desired charge.

Conductive media can be easily recovered because the charge on the media can be controlled. The media can be charged to be within a range, or the charge on the media can be neutralized, so that the media concentrates in a media-rich stream. The media-rich stream can be combined back into the mixture particles for charging.

It should be noted that the term "conductive" means in this case that the resistance is lowered into a range that does not allow large point charge accumulation as is seen in most standard plastics. This range of conductivity might still be far too low to measure with a standard conductance meter. Point static charge accumulation becomes difficult to measure at resistances of many mega Ohms per cm.

In one implementation, iron powder with a nominal particle size in the range of 100–300 microns is used at approximately 30–50% by weight of the media. This mixture can be extruded and pelletized on a standard pelletizing system. Incorporating the iron powder allows excellent charging of mixture components based on interaction between the selected charge control agent in the pellet while enabling the pellet to readily be attracted to a standard industrial magnet device for removal of ferromagnetic materials from a passing mixture. Such a magnet can be a drum, cross-belt or other commonly employed variety of magnet.

Another benefit of using a media with ferromagnetic additives is that the mixture can be agitated effectively using strong magnet bars or stirrers that are rotated or moved within the mixture. The ferromagnetically loaded media will adhere to these magnetic agitation devices and the mixture can be stirred without fear that the mixture is contacting a non-mediated surface.

Rotating or moving magnets can also be placed outside of the charging vessel and the mixture can be agitated by virtue of the fact that the media will be moved as the magnets outside the charging device are moved, much as a stirring bar can be used to agitate fluid in a glass beaker. Alternatively, the charging device may simply be inclined such that constant agitation moves material from one end to the other.

Colorants can also be incorporated in media to facilitate media recovery. Colorants such as those typically used in coloring plastics can be incorporated in the media. To avoid loss of portions of the flake mixture, the color chosen can be distinct from the colors found in the flake mixture. Color sorting to recover such media can be performed after TES using a device such as a commercial color sorter.

Similarly, functional additives can be added to media to increase the density of the resulting media. Suitable additives can include high density materials, such as inorganic oxides, metal powders or glass fibers. The higher density media can be recovered after TES using density separation techniques.

A foaming agent can also be added to the media. Foaming agents can include blowing agents typically used to create plastic structural foams. Where foaming agents are used, the media can be fed to the system in a compacted state. Heating at some stage prior to extrusion of the product flakes activates the foaming agent, creating larger and thicker media particles. The larger particles can be separated by devices, such as air aspirators or roll sorters, that can sort by surface area to mass and/or thickness.

Addition of conductive additives, such as carbon black particles, stainless steel fibers, metal powders or antistatic agents, can also enable removal of media based on differential charging of the media material relative to the materials to be separated. In this case, the media could be separated in downstream devices such as the TES. Media incorporating sufficient amounts of conductive material can be charged when an electrically charged material (i.e., a high voltage source) is brought into contact with the conductive media. Electrically charging the media controls the charge that can be transferred to the particles to be separated by the TES separator. Similarly, because of the conducting material the media can be discharged when it contacts an electrical ground. Media with little or no charge tends to not be affected by the TES separator and when the media falls through the separator, the majority of the media fall into (and can be recovered from) the middlings.

Another strategy for selecting a media is to use as media a material that can also function as a compatibilizer for two or more polymeric components of the polymer mixture. Compatibilizers can be used to reduce the interfacial energy between polymeric components in a blend by preferentially concentrating at the interface. Preferential concentration at the interface can occur when the compatibilizer has a dielectric constant between the dielectric constants of the two polymeric components. A dielectric constant intermediate between the two polymeric components suggests that the charging properties of the compatibilizer should be intermediate between the two polymers. Thus, a single material or multiple materials (e.g., a mixture of materials) can serve as both a compatibilizer for materials in a mixture and as a media for the separation of materials in the mixture. Some of the media can be recovered as part of the product, enabling automatic control of both TES and formulation.

In one embodiment, a media that can also function as a compatibilizer can be a copolymer, such as a copolymer of two or more polymeric components of the mixture to be separated. A blend of incompatible polymers A and B can be compatibilized by adding block copolymers of A and B or random copolymers of A and B. Polymers A and B can also be compatibilized by adding block or random copolymers of A and C, where C would prefer to be in a matrix of B rather than in a matrix of A. Polymers A and B can also be compatibilized by adding block or random copolymers of C and D, where C prefers to be in one of either A or B and D prefers to be in the other polymer. Any of these copolymeric materials should act as compatibilizers for polymers A and B, and might be expected to have charging properties intermediate between A and B.

Next, consider the separation of a binary mixture without media. Two products can be recovered by splitting the mixture in the middle at the bottom of the TES separation chamber. The major component in the feed will tend to have higher product purity because it is able to charge the minor component such that the vast majority of the minor component ends up on its own side of the bottom of the separator. The minor component generally tends to have lower product purity.

If a media with charging characteristics between those of the two components is added to the mixture, the purities of the two products will tend to increase, although the purity of the minor component will remain somewhat lower. If allowed to fall through the TES separator with the mixture, the media will tend to fall mostly with the minor component, since it acquires much of its charge from the major component. A lesser amount of media will fall with the major component. If the media is actually a compatibilizer for the mixture, it will automatically be added preferentially to the component most in need of compatibilizer.

In many cases, it may be expected that a material useful as a compatibilizer will also be useful as a media for the same mixture, although it may not be possible to find a readily available and appropriate material in every case. Since the compatibilizer should go to the interfacial regions between the two polymers in a blend, a material selected to function as a compatibilizer must either have a dielectric constant intermediate between the two polymers, or contain blocks that are compatible with the two polymers (for example, by selectively reacting with functional groups in one of the two polymeric components). In either case, the electrical properties of the compatibilizer would tend to be intermediate (on average) relative to the two components. Appropriate materials can be identified by selecting a material or materials that has the desired compatibilizing or charging properties—for example, selecting a known compatibilizer for the desired product—and testing the material to determine whether it has appropriate charging or compatibilizing properties—i.e., charging properties between those of the material to be separated.

It is useful in some cases to recover only a portion of the media while allowing some of the media to leave with the TES product streams. For example, in some cases a much smaller amount of media may be required for compatibilization than is required for mediation. If more media is required to control the charging than is desired in the product, a portion of the media can be recovered.

Figure 2:
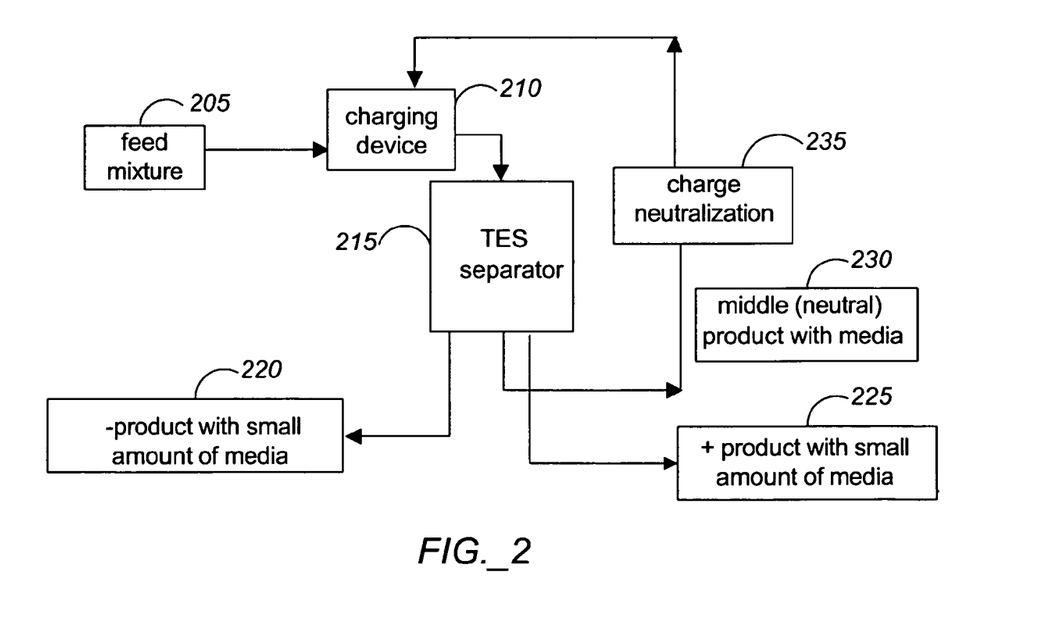
FIG. 2 is a schematic diagram describing a system for the partial recovery of media.

One example of partial media recovery is recycling the middle (neutral) stream from a TES separator. Since the media is expected to charge somewhere between the positive and negative charging product materials, typically a large fraction of the media separates into the middle stream. FIG. 2 illustrates one embodiment of a system 200 for partial recovery of media. A plastic feed 205 is introduced into a charging device 210 with media. The media controls the charging of the plastic feed 205 and the combined media and feed are dropped through a TES separator 215. The output of the TES separator 215 is a positively charged product with a small mount of media 220, a negatively charged product with a small amount of media 225 and the middlings 230, composed primarily of media. The middlings enter a charge neutralization device 235 and are recycled back into the charging device 210 to be used in charging the next batch of feed mixture. A strategy for partial recovery such as that shown in FIG. 2 allows a relatively high throughput.

One beneficial example of partial media recovery is where the media itself is a compatibilizer for the product mixtures. Since a compatibilizer will often be added to a product when the product is blended with another polymer, the use of a single material as both a compatibilizer and charging media can be desirable, particularly in light of the fact, discussed above, that the media tends to segregate in higher amounts into the less pure fraction of the separation product, where the presence of a compatibilizer can be most useful. By providing for the partial recovery of media in such situations, it can be possible to control the amount of compatibilizer that ends up in the separation products.

For example, assume that a compatibilizer C having a charging property between that of A and B, is added a mixture of A and B. The relative charging of A, B and C depends at least in part on the quantity of each component in the mixture and the surface area to mass ratio of the particles of A, B and C. If the majority of the mixture is particles of A, the A particles cause B and C to charge with the same sign. As a result, the C particles will largely segrate to the B-rich product stream, with a minority of the C particles segrating into the A-rich stream. The B-rich stream also can include a fraction of the A particles.

Partial media recovery can also be implemented where the media is a mixture of materials, where a portion of the media contains functional additives or is otherwise recoverable from the mixture before or after TES as described above. The remainder of the media is allowed to end up in the TES product streams.

Successful mediated TES requires particles in the feed mixture to contact a large total surface area of media particles. The larger the surface area of the media, the more effective is the media at controlling the charges on components in the mixture and the lower will be the charge on the media. Low media charge further concentrates the media in the middlings (center) of a TES separator, which can further facilitate media recovery if the middlings are to be recirculated. However, a large media surface area can limit the throughput in a TES separator—for example, when the media must be screened out of the mixture falling into the separator, larger media pieces will lower the potential throughput by blocking the screen holes enough to prevent maximum passage by the feed mixture. Such limits on throughput can be avoided by using other methods such as those described above for media recovery. One such device for feeding a TES separator is described in Example 1.

Example 2 demonstrates that plastics with particular types of ferromagnetic additives, such as iron, can have charging properties that are qualitatively similar to the charging properties of unfilled plastics. This result suggests that if an unfilled media formulation is found, it can likely be compounded with ferromagnetic additives that enable its recovery from the separated products without altering its effect on charging of the mixture components.

Other ferromagnetic materials, such as magnetite, can be used as functional additives for plastics. Example 3 describes the magnetic and charging properties of a plastic with iron ore (magnetite) added. When iron ore is added to the media, the charging differs from the base plastic, generally in an amount proportional to the amount of additives included.

A media material (that is, the material that will be used to mediate charging, as opposed to any other material or additive that may be present for other reasons) is chosen such that charging of components of a mixture occurs to best effect separation. For example, in one separation of mixtures of ABS and HIPS, it was observed that a particular grade of polycarbonate (PC) caused ABS and HIPS to charge with opposite polarities. This grade of PC is therefore chosen for a media in the separation of mixtures of ABS and HIPS. To select the media material, the charging properties of the particles of the mixture can be experimentally determined and a material or combination of materials which charges intermediate to the components to be separated is selected.

In one embodiment, a material with intermediate charge properties of components in a mixture can be selected by constructing a polymeric alloy or blend which charges intermediately to the components of the mixture. For example, HIPS and ABS are generally incompatible, but a blend of HIPS and ABS can be used to create pellets of media that effectively charge ABS and HIPS with opposite polarity. A formulation for the media can be created in extrusion such that the precise charging characteristic of the media is defined. The formulation can be selected by starting with a composition similar to the mixture of the feed composition, or a mixture that uses approximately equal parts of each mixture component if the quantities of each component in the mixture are not constant or are unknown. The composition can then be adjusted based on actual or test separations to optimize the media. Alternatively, the separator middlings can be used as media material. The middlings can be extruded into pellets in either a batchwise or semicontinuous mode.

In a mixture in which two components of the mixture contain a similar material as constituents, such as HIPS and polystyrene (PS) or HIPS and polyphenylene oxide (PPO) PPO/HIPS blends or PS and PPO/HIPS blends. Such pairs of constituents often charge in a similar way to most other types of polymers, which can make it difficult to find a media that will charge intermediate between the two constituents. One technique for creating a media that charges intermediately between such components involves the creation of a blend which has an intermediate composition to the two materials by combining them in the media. For example, PS can be separated from HIPS using a media that is essentially HIPS with more PS (and consequently less of the rubber component which is used to toughen PS and make HIPS). Such a blend can be created by extruding a mixture of the HIPS and PS in a predetermined ratio. In one implementation, the ratio of the extrusion is similar to the ratio of materials generally found in the mixed materials.

Frequently mixtures are encountered which contain three components where two of the components are compatible and one is incompatible with either of the other two—for example, a mixture of HIPS, a PPO/HIPS blend, and ABS. A media can be selected which charges the two compatible components (in this case HIPS and the PPO/HIPS blend) to the same polarity and the incompatible component to an opposite polarity. This can be accomplished by creating a media which has a composition very similar to the component which charges at an intermediate level within the ternary mixture but increasing the content of the media in a chemical or polymer which will predictably shift the intermediately charging component toward the side of the other component with which it is compatible. This can be especially beneficial if the goal of the separation is to substantially separate the two compatible components, as is often the case. If the goal of the separation is to isolate all three components of such a mixture, shifting the intermediate component just slightly toward the charge of the other constituent with which it is more compatible can be sufficient. Thus, the most important separation is accomplished with slightly greater effectiveness, but all three components can be purified. This technique may not be possible if the intermediately charging component is not compatible with the other two components of the mixture.

One difficulty associated with media made from insulating materials (such as plastics) is that charge can build up over time on the media. The amount of media charge is determined in part by the composition of the mixture of materials contacted by the insulating media. Unless this media charge is controlled, the media's effectiveness will vary over time and with feed composition. This variation can result in inconsistent TES performance. Charge build-up on media can be controlled by periodically neutralizing the charge on the media. For particulate media, this can be accomplished by conveying the media (perhaps along with a portion of the plastic mixture) past a charge neutralization device such as an ion air blower. With fixed media, such as a film or coating incorporated in the device, the flow of the plastic mixture past the media must be stopped as the media is subjected to a charge neutralization process. Alternatively, charge build-up on media can be limited by making the media sufficiently conductive that charge can be effectively transferred to an attached electrical ground. An example of this is particulate media with a conductive additive where the media is in contact with a grounded surface or a grounding device. Example 4 describes the preparation and testing of a conductive tailored media sheet (TMS). Alternatively, fresh media from a storage vessel can be constantly metered into the mixture as some fraction of the quantity of media that is being recirculated while a given quantity of the recirculating media is continuously removed. The media which is removed can be subjected to a regeneration process or processes, such as washing and drying, de-dusting, de-ionization, grounding, drying or passage of a sufficient period of time such that residual charge is lost.

In addition to the build-up of charge on media, very small particles (fines) and dust can attach to particulate and fixed media. Charge neutralization processes and/or mechanical devices such as brushes or scrapers, optionally in conjunction with low pressure air suction for dust removal, can be used to remove fines and dust from the media.

EXAMPLES

The following examples are illustrative only and are not intended to limit the scope of the invention described in the claims.

Example 1

Recovery of Ferromagnetic Media with a TES Feeder

Figure 3:
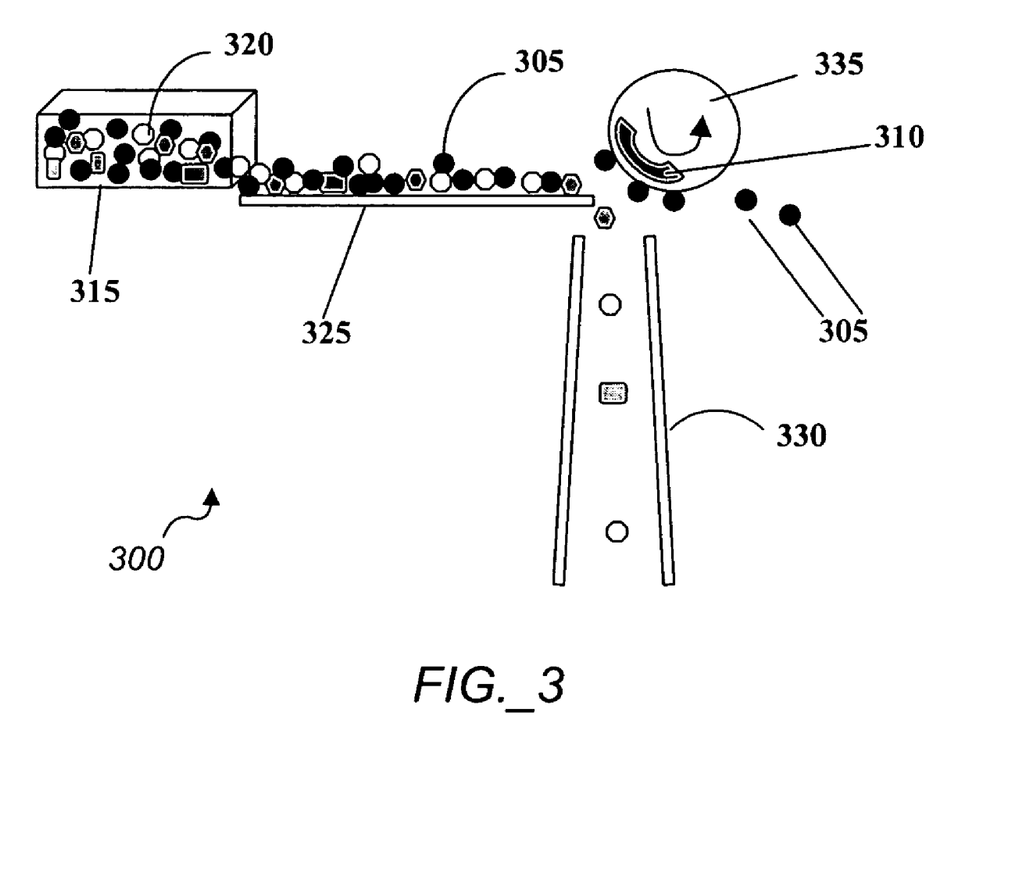
FIG. 3 shows an example arrangement of a mediated TES feed system with ferromagnetic media.

As shown in FIG. 3, a media 305 incorporates a ferromagnetic material in an amount sufficient to allow it to strongly attach to a magnet 310. The media (shown as black spheres) is combined first with the feed mixture 315 in a charging device 320. The product from the charging device ends up on a vibratory pan 325 that feeds the top of the TES separator 330.

The ferrous media 305 is strongly attracted by a magnet at the end of the vibratory pan 325 feeder just above the TES separator 330. When a rotatable drum 335 encloses the stationary magnet 310, the magnet 310 attracts the ferromagnetic media 305 from the vibratory pan 325 and onto the drum surface 335. After the drum surface 335 with the attracted ferromagnetic media 305 rotates away from the magnet 310, the media 305 moves far enough away from the magnet 310 that gravity overcomes the magnetic force of the magnet 310, causing the media 305 to fall off the drum 335 and collect at an area segregated from the particles. After falling off the drum 335, the media can be de-ionized (if the conductivity of the media is too low for charge control via contact) and returned to the charging device 320. Alternatively, the charging feeder can be electrically isolated and a voltage can be applied to enable the media to contact charge to the desired voltage. Generally, it is assumed that the desired media charge will be neutral, in which case the vibratory feeder or the drum magnet can be grounded and be used to contact ground the media.

A cross-belt magnet which sweeps the ferromagnetic material to the side of a large suspended plate magnet that is positioned at the end of a vibratory feeder can alternatively be used. A conveyor can then be used to return the media to a storage device or to the other end of the charging feeder deck.

Another type of charging device, such as a rotating drum, stirred vessel or air conveyance system, can be used either in conjunction with a vibratory feeder or in place of such a unit.

"Soft" ferromagnetic material demagnetizes spontaneously when removed from a magnetic field. A soft ferromagnetic media material is combined with the mixture on a vibratory feeder with a ferromagnetic deck such that the media particles are attracted to the deck and adhere magnetically, reducing or eliminating contact between the mixture (generally non-conductive) and the deck. As the pellets of media gradually lose their magnetic field, they move toward the end of the device and are caught again by the magnet. This renews their magnetic property. It can also enable the media to be de-dusted in a recirculatory process or replaced more easily. In one embodiment, the vibrator can be configured to have two vibratory settings. A lower setting allows the "soft" ferromagnetic material to adhere to the ferromagnetic deck and a higher setting shakes it all loose from the deck. The higher setting can be used whenever the media requires changing. This can be useful for changing worn media or for when a different media variety is required.

A "hard" ferromagnetic material, which retains its magnetism when removed from a magnetic field, can also be used as a component of the media particle but this can increase the cost of the media. This improves adhesion of the media to standard steel charging device surface.

Example 2

Charging Properties of Plastic with Ferrous Additives

High impact polystyrene (HIPS) (43% of the total weight, natural Styron 498, Dow Chemical Co., Midland, Mich.) was melt compounded in a twin screw extruder with 52% iron (grade Ancorsteel 1000 (particles less than 200 microns), Hoeganaes Corp., Riverton, N.J.) that had been dispersed as a paste with epoxidized soybean oil (ESO) (6% of the total weight, Plaschek 775, Ferro Corp., Cleveland, Ohio). The iron-filled HIPS pellets were highly susceptible to magnetic fields. A handful of pellets held 150 mm beneath a flat plate magnet was drawn to the magnet, suggesting the feasibility of an operation such as shown in FIG. 3.

About three grams of HIPS pellets were charged by swirling in either polystyrene or polycarbonate containers. The charge on the pellets was measured using a Faraday cup. Table 1 gives the charge per mass of the natural and 52% iron-filled HIPS pellets. Since there is less plastic, the iron-filled HIPS acquires less charge per mass than the natural HIPS.

The charging of the plastic with added iron is qualitatively similar to that of the unfilled plastic, however.

TABLE 1

| Charging (nC/g) of natural and 50% iron-filled HIPS in PS and PC containers | | |
|---|---|---|
| Sample | charging (nC/g) versus PS container | charging (nC/g) versus PC container |
| natural HIPS | +0.5 | −1.5 |
| 52% iron-filled HIPS | +0.4 | −0.7 |

The iron-filled plastic readily discharged in the Faraday cup. This suggests that charge neutralization in a process such as that shown in FIG. 3 can be accomplished by contacting the iron-filled pellets with grounded metal.

Example 3

Charging Properties of Plastic with Ferrous Additives

Gray polypropylene (PP) (52% of the total weight, derived from post-consumer appliances) was melt compounded in a twin screw extruder with 42% magnetite (Grade M-25 (99% of particles less than 44 microns), Pea Ridge Iron Ore Co.) that had been dispersed as a paste with epoxidized soybean oil (ESO) (6% of the total weight, Plaschek 775, Ferro Corp.). The magnetite-filled PP pellets were highly susceptible to magnetic fields, though not as susceptible as the iron-filled HIPS of Example 2. A handful of pellets held about 50 mm beneath a flat plate magnet was drawn to the magnet.

About five grams of PP pellets were charged by swirling in either polystyrene or polycarbonate containers. The charge on the pellets was measured using a Faraday cup. Table 2 gives the charge per mass of the PP 101 and 42% magnetite-filled PP pellets. The magnetite-filled PP acquires less charge per mass than the gray PP without magnetite. The plastic with added magnetite also charges with a different sign versus the polystyrene container. When compared to the HIPS charging data in the previous example it must be noted that the magnetite was substantially smaller in particle size. This likely allowed a much larger surface area contribution due to the magnetite than was found with the much coarser iron powder in the previous example. A coarser grade of magnetite would likely reduce the difference between the filled and unfilled charging performance.

TABLE 2

Charging (nC/g) of gray PP 101 and 42% magnetite-filled PP (PPM 42) in PS and PC containers

| sample | charging (nC/g) versus PS container | charging (nC/g) versus PC container |
|---|---|---|
| PP 101 | −2.6 | −3.3 |
| PPM 42 | +1.4 | −0.4 |

The magnetite-filled pellets do not readily discharge, which is in contrast to iron-filled HIPS that discharges almost completely in a Faraday cup. This suggests that the use of magnetite-filled plastic as media would require methods other than contact grounding to achieve a zero net charge.

Example 4

Preparation and Evaluation of Tailored Media Sheet

The raw materials for the TMS in this example were ABS (Magnum 3490 from Dow Chemical) and Beki-Shield GR75/C12-E/5 from Bekaert Corporation. Beki-Shield GR75/C12-E/5 is a concentrate containing 75% stainless steel fibers (8 micron diameter), 10% thermoplastic polyester in which the fibers are embedded, and 15% ethylene acrylic acid zinc ionomer as a coating for the 2 mm diameter pellets. ABS tensile specimens with 0, 5 and 10 weight percent Beki-Shield were compounded and injection molded into tensile specimens.

The HIPS used in this trial was gray HIPS recovered from office automation equipment by MBA Polymers. This HIPS was injection molded into tensile specimens using standard procedures.

ABS specimen was placed in contact with a grounded stainless steel plate. A HIPS specimen with zero initial charge was then rubbed against the ABS specimen, while the specimen was still in contact with the plate, for about 5 seconds. The charge on the HIPS specimen was then measured with a Faraday cup. The charge on the HIPS specimen was then neutralized with the deionizing blower and the test was repeated. The charging and measurement sequence, which took between 10 and 20 seconds per cycle, was repeated about 20–30 times for both ABS without Beki-Shield and ABS with 5 weight percent Beki-Shield. The charge on the ABS specimen was also measured periodically to see if it would stabilize at a steady value.

The charge on the ABS specimens gradually increased and stabilized at about +13 nC (5% Beki-Shield) and +16 nC (without Beki-Shield) after about 10–20 cycles of charging. The charge on an ABS specimen with 10% Beki-Shield was close to zero, indicating that it was conductive. The charge on the HIPS specimen remained constant at about −1.0 to −2.0 nC for each cycle. Natural ABS would not charge against any of the Beki-Shield filled ABS materials. This suggests that the stainless steel is not drastically altering the charging properties of the ABS.

In addition, a 10% Beki-Shield specimen was rubbed against a polyethylene bag with which the specimen was held. The specimen was placed in front of the deionizing blower and the charge on the specimen was measured. A measured charge of about −0.2 nC indicated that electrons were migrating from the bag to the ABS specimen. This further confirmed the conductivity of the ABS with 10% Beki-Shield.

The results of these tests suggest that there was almost no conductivity in the ABS with 5% Beki-Shield, and that ABS with 10% Beki-Shield was conductive. In addition, the ability of the filled materials to charge HIPS is comparable to that of ABS without additive. Because charging HIPS against ABS with 0 and 5% Beki-Shield transferred the same charge to the HIPS every time, even after the charge on the ABS was saturated, it is likely that a large amount of plastics in a mixture could be charged before the media is saturated to the extent that it can no longer charge the mixture, even if only 0 or 5% Beki-Shield is used.

The invention has been described in terms of particular embodiments. Other embodiments are within the scope of the following claims. For example, the steps of the invention can be performed in a different order, and/or combined, and still achieve desirable results. Also, a media can be selected that is not intermediate between two of the feed material components.

What is claimed is:

1. A method of separating a polymer mixture, comprising:
providing a mixture including polymeric components;
adding to the mixture a particulate media for selectively mediating a triboelectric charging of the mixture, the particulate media including a polymeric material having a selected position within an electrostatic charging sequence and a functional additive, wherein the functional additive is incorporated into the polymeric material;
triboelectrically charging the mixture with the particulate media;
separating two or more components of the mixture according to the triboelectric charge; and
recovering at least a portion of the particulate media using a recovery process, wherein the functional additive is selected for compatibility with the recovery process.

2. The method of claim 1, wherein:
the recovery process is a magnetic recovery process; and
the functional additive is a ferromagnetic material.

3. The method of claim 1, wherein:
the recovery process is a color sorting process; and
the functional additive is a colored material.

4. The method of claim 1, wherein:
the recovery process is a density separation process; and
the functional additive is a density augmenting material.

5. The method of claim 1, wherein:
the recovery process is a separation process based on thickness or surface-to-mass ratio; and
the functional additive is a foaming agent.

6. The method of claim 1, wherein:
the recovery process includes the collection of a neutral middle fraction in a triboelectric separator; and
the functional additive is a conductive material.

7. The method of claim 1, wherein:
the recovering is performed before the separating.

8. The method of claim 1, wherein:
the recovering is performed after the separating.

9. The method of claim 1, wherein:
the functional additive is a conductive material; and
the separating and recovering include passing the mixture and media through an electric field to cause the two or more components and the particulate media to deflect in different amounts such that the particulate media is separated from the two or more components.

10. The method of claim 1, wherein adding to the mixture a particulate media includes adding to the mixture a particulate media including a compatibilizer, the compatibilizer capable of reducing interfacial energy in a target blend of one or more of the polymeric components and one or more incompatible polymers by preferentially concentrating at an interface between one of the polymeric components and one of the incompatible polymers in the blend.

11. The method of claim 10, wherein:
providing a mixture including polymeric components includes providing a first polymeric component with a first dielectric constant and a second polymeric component with a second dielectric constant; and
adding to the mixture a particulate media includes adding to the mixture a particulate media having a dielectric constant between the first dielectric constant and the second dielectric constant.

12. The method of claim 10, wherein:
providing a mixture including polymeric components includes providing a first polymeric component; and
adding to the mixture a particulate media includes adding to the mixture a particulate media that includes a component capable of selectively reacting with a functional group in the first polymeric component.

13. The method of claim 10, wherein:
providing a mixture including polymeric components includes providing a first polymeric component and a second polymeric component; and
adding to the mixture a particulate media includes adding to the mixture a particulate media having charging property between a charging property of the first polymeric component and a charging property of the second polymeric component.

14. The method of claim 1, wherein recovering at least a portion of the particulate media includes recovering media that deflects only slightly in an electric field compared with the deflection of other components in the mixture, wherein the media deflects only slightly because of a low average charge compared with the polymeric components in the mixture.

15. A method of separating a polymer mixture, comprising:
providing a mixture including polymeric components;
adding to the mixture a particulate media for selectively mediating a triboelectric charging of the mixture, the particulate media including a polymeric material having a selected position within an electrostatic charging sequence, the particulate media including a conductive additive;
electrically charging the particulate media with a high voltage source;
triboelectrically charging the mixture with the particulate media; and
separating two or more components of the mixture according to a triboelectric charge of the polymeric components.

16. The method of claim 15, further comprising:
discharging the media after the triboelectric charging; and
after discharging, recovering the media as a neutral fraction in a triboelectric separator.

17. The method of claim 15, wherein adding to the mixture a particulate media includes adding to the mixture a particulate media wherein the conductive additive is incorporated into the polymeric material.

18. A method of separating a polymer mixture, comprising:
providing a mixture including polymeric components;
adding to the mixture a particulate media for selectively mediating a triboelectric charging of the mixture, the particulate media including a polymeric material having a selected position within an electrostatic charging sequence and a ferromagnetic additive, wherein the ferromagnetic additive is incorporated into the polymeric material;
triboelectrically charging the mixture with the media; and
separating two or more components of the mixture according to a triboelectric charge of the polymeric components.

* * * * *

UNITED STATES PATENT AND TRADEMARK OFFICE
CERTIFICATE OF CORRECTION

PATENT NO. : 7,063,213 B2  Page 1 of 1
APPLICATION NO. : 10/775741
DATED : June 20, 2006
INVENTOR(S) : Laurence E. Allen, III and Brian L. Riise It is certified that error appears in the above-identified patent and that said Letters Patent is hereby corrected as shown below:

Column 18, Line 58 at Claim 4; replace:
"The method of claim 1, wherein;" with
--The method of claim 1, wherein:--

Signed and Sealed this

Twenty-sixth Day of June, 2007

JON W. DUDAS
*Director of the United States Patent and Trademark Office*